I. S. McGIEHAN.
PNEUMATIC TIRE FOR VEHICLES.
APPLICATION FILED MAY 15, 1911.
1,110,451.  Patented Sept. 15, 1914.
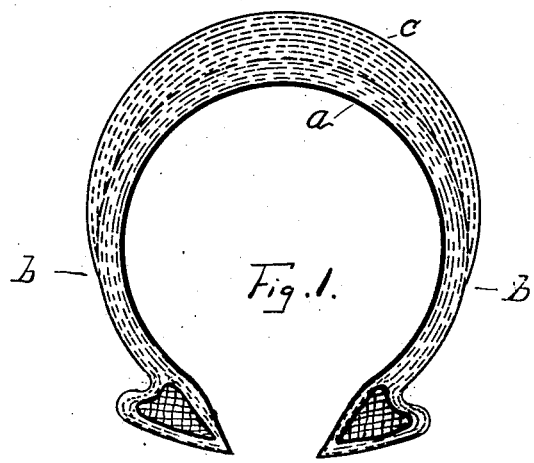
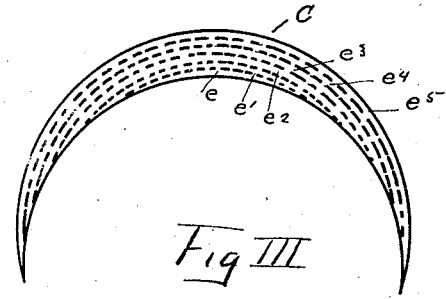
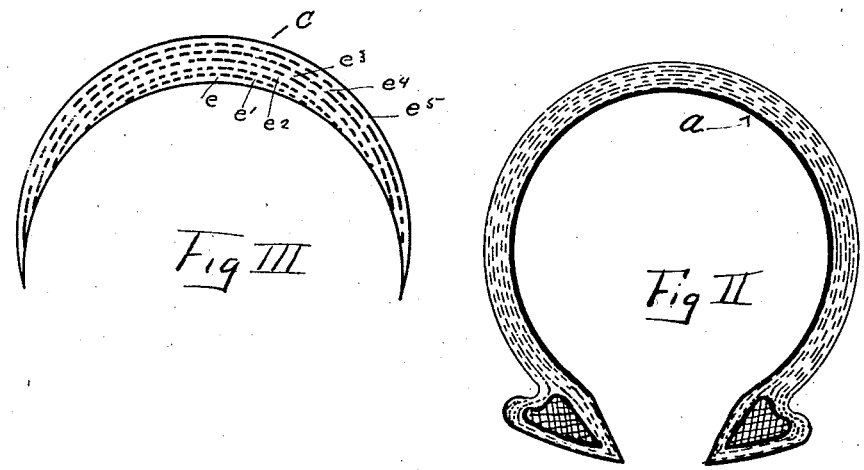

UNITED STATES PATENT OFFICE.

ISAAC S. McGIEHAN, OF LONDON, ENGLAND.

PNEUMATIC TIRE FOR VEHICLES.

1,110,451.   Specification of Letters Patent.   Patented Sept. 15, 1914.

Application filed May 15, 1911. Serial No. 627,815.

*To all whom it may concern:*

Be it known that I, ISAAC SEAMAN MC-GIEHAN, a citizen of the United States, and a resident of 11 Regent street, London, S. W., England, have invented a new and useful Improvement in Pneumatic Tires for Vehicles, of which the following is a specification.

This invention relates to the construction and reconstruction of pneumatic tires for vehicles.

It has for its object to create a tire constructed wholly of rubber filled fabric, the inner carcass of which can be made and vulcanized separately from the tread portion, and reinforced and strengthened by the addition of the tread portion which may also be vulcanized separately, so that the tire may be built up by the wrapping process if desired. The tread is so formed and compressed before its application to the carcass that it becomes non-stretchable, and the tire is very much stronger and more durable than those of the usual method of construction, and creates a more homogeneous structure. The carcass and tread can be of one single structure if desired, and vulcanized as such.

In the accompanying drawings, which form a part of this specification, my invention is illustrated in various figures with similar letters of reference to indicate corresponding parts.

Figure 1 represents the tire complete, with the carcass $a$. which forms the foundation, and the tread or wear-surface $c$. made together,—the construction of which will be hereinafter described. Fig. 2 represents the carcass $a$. as it is sometimes molded and vulcanized before the tread $c$. is applied. Fig. 3 represents the tread after it is completed and vulcanized before it is applied to the carcass. In this form it can be used for new tires or for reconstructing old carcasses.

Open mesh fabric is used in order that the thin spreading rubber, when coming in contact with the fabric, practically surrounds each strand independently, thus each is better filled with rubber, the capillary attraction of the strand taking in rubber from all sides except where it crosses its neighbor.

One of the principal objects in having the mesh particularly open is that a greater amount of rubber may be filled into the mesh of the fabric. Thus when built up, the rubber joins and unites with that part of the rubber which fills the mesh in the next layer of fabric, and so on through the whole thickness of the carcass or tread, forming small square irregular columns of rubber which provide a holding and wearing surface that cannot be ripped, torn, blistered or stripped, or separated.

The method of constructing the tread separately is to take sheets of fabric the desired sizes and thicknesses, with a very open mesh, say eight or ten to the inch, and spread or friction them with rubber to the extent that the open spaces between the strands of fabric are filled with rubber in the form of square blocks, leaving as little as possible on the surface. The sheets are then cut on the bias in lengths and widths suitable to form a tread band of the desired size to fit the carcass, as illustrated in Fig. 3 in cross sections. These strips graduate in width from $e$. to $e^5$.—the outer strip $e^5$. being sufficiently broad to form a transverse circle over the carcass $a$. from $b$. to $b$. Fig. 1. The narrow strip $e$. being next to the center of the carcass, the whole tread taking the shape of a crescent as Fig. 3, with the narrowest piece of fabric $e$. forming the inside center of the crescent, and vulcanized on a circular mandrel in this form,—the tread forming an endless non-stretchable band.

The crescent tread thus provided is made a fraction smaller than the circumference of the carcass to which it is to be applied, and it also forms a sharper transverse curvature than the carcass. Thus, when it is vulcanized to the carcass as hereinafter described, it imparts a sphincter grip which draws against the carcass and strengthens the union between the two. The fabric tread in this way reinforces and strengthens the carcass; the sharper transverse curvature causes the sides of the crescent to lay closer against the wall of the carcass, and prevents separation at that point.

In reconstructing old covers with this principle, the old or worn cover is placed upon a revolving mandrel, and the old rubber is cut, scraped and buffed from the original carcass until the original fabric foundation is reached. The surface is then solutioned and covered with a sheet of quick-curing rubber. The under side of the finished tread band, as in Fig. 3 is also coated with the same solution. The tread is then put in place on the old carcass, and the two are bound tightly with strips or bands of canvas which have been soaked in boiling water or a steam chest. The winding is done very tightly to make a very close union between the casing and the new tread, and is continued until the entire tire is covered. After this is done, the tire so wound, is placed in a vulcanizer and remains there until the rubber which unites the cover and casing is thoroughly cured and vulcanized. The canvas is then unwound, and the process of reconstruction is complete.

The method of applying the tread band to a new carcass is the same as that above described.

In making new tires complete as one structure, the carcass $a$, is usually begun with a very tough fabric with a sufficient number of layers to create the body or carcass proper, the number of body layers depending to a great extent upon the size of the tire. The carcass being provided with sustaining beads of any desired form. The process of building up is continued preferably with open mesh fabric as above described. The tread $c$, being built on the carcass in the same manner as previously described until the desired thickness of tread or wearing surface is obtained. The shoe or cover thus created is put in a mold, pressed, and vulcanized into one inseparable homogeneous structure.

Having thus described my invention, what I claim and desire to secure by Letters Patent is:—

1. A pneumatic tire composed of a fabric carcass or foundation and a tread portion composed of layers of rubber filled fabric of different widths formed into a crescent band united thereto by an interposed film of softer rubber, all homogeneously vulcanized substantially as described.

2. A reconstructed pneumatic tire consisting of a suitable carcass or foundation in combination with a substantially non-stretchable fabric band tread portion united to the said carcass by means of an intermediate film of quick-curing rubber as herein specified.

ISAAC S. McGIEHAN.

Witnesses:
  C. P. LIDDON,
  R. WILLIAMS.